United States Patent
Yamanaka et al.

(10) Patent No.: US 6,644,035 B1
(45) Date of Patent: Nov. 11, 2003

(54) GAS TURBINE AND GAS TURBINE HIGH TEMPERATURE SECTION COOLING METHOD

(75) Inventors: Kazunori Yamanaka, Hitachi (JP); Shinya Marushima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 19 days.

(21) Appl. No.: 10/082,060

(22) Filed: Feb. 26, 2002

(30) Foreign Application Priority Data

Aug. 29, 2001 (JP) ........................ 2001-259125

(51) Int. Cl.$^7$ ................................................ F02C 7/12
(52) U.S. Cl. .......................................................... 60/806
(58) Field of Search ............................ 60/782, 806, 805

(56) References Cited

U.S. PATENT DOCUMENTS 3,163,004 A * 12/1964 Spillmann et al. ............ 60/806
6,367,242 B1 * 4/2002 Uematsu et al. ......... 60/39.182

FOREIGN PATENT DOCUMENTS

JP          10-196316          7/1998

* cited by examiner

Primary Examiner—Ehud Gartenberg
(74) Attorney, Agent, or Firm—Mattingly, Stanger & Malur, P.C.

(57) ABSTRACT

A gas turbine comprising a compressor, combustor and turbine further comprises (1) a cooling air system for supplying part of air compressed by a compressor to the high temperature section of the turbine, (2) a heater exchanger for exchanging heat of part of air compressed by the compressor, this heater being mounted on the cooling air system, and (3) a system for adjusting the air temperature downstream from the heater exchanger in conformity to the operation period of the turbine.

5 Claims, 5 Drawing Sheets

GAS TURBINE AND GAS TURBINE HIGH TEMPERATURE SECTION COOLING METHOD

BACKGROUND OF THE INVENTION

1. Field of the Invention

The present invention relates to a gas turbine and a method of cooling the high temperature section of gas turbine.

2. Description of Prior Arts

To meet growing demands for electric power in recent years and to combat global warming, it is necessary to increase the capacity and enhance efficiency of gas turbine power generation facilities. Especially in gas turbine power generation facilities where fuels are supplied and burnt with air compressed by a compressor and fed to the combustor and the gas turbine is driven by this combustion gas, large capacity and high efficiency can be achieved by further increasing fuel temperature. In this case, however, the gas turbine for collecting energy of the combustion gas exposed to high temperature will be damaged and a serious accident may occur if it is not cooled. So in gas turbine power generation facilities where combustion gas temperature is high, compressed air and steam are used to cool the high temperature section of gas turbines.

With consideration given to possible pressure loss in the flow path of cooling air, high-pressure air is used as cooling air for cooling the high temperature section of a turbine.

In an open cooling gas turbine where cooling air is discharged into the turbine gas path, air extracted from the low-temperature compressor is directly used as cooling air. Air discharged from the compressor is cooled by a cooler, and is used to cool high temperature sections.

In a closed cooling type gas turbine where cooling air used to cool the high temperature section of the turbine is collected into the combustor and is used as combustion air, there is pressure loss of cooling air in the flow path of the turbine high temperature section. So in order to collect cooling air into the combustor, the pressure of air discharged from the compressor must be increased by a boost compressor. If it is increased by the boost compressor, cooling air temperature will rise. This requires installation of a cooler which adjusts the cooling air temperature to an appropriate level.

For example, JP A No. 10-196316 discloses a system configuration where air discharged from the compressor is cooled by a heater exchanger to cool the high temperature section of a turbine.

SUMMARY OF THE INVENTION

When the turbine is started, the temperature of coolant used by a heater exchanger for cooling the cooling air is low, and cooling air temperature at the heater exchanger outlet is reduced excessively, with the result that mist may occur in the cooling air downstream from the heater exchanger. If mist occurs in cooling air, dust contained in cooling air may be deposited on the wall surface of the cooling flow path. Further, if multiple dust particles are combined to big lumps of dust, a complicated and elaborately formed cooling flow path formed on the turbine high temperature section may be locked. Further, the auxiliary machines constituting the cooling air system may be damaged. Especially the boost compressor constituting the system is a rotary body driven at a high speed. So if mist in air with high-speed air flow is supplied to the boost compressor, it will collide with the impeller at a high speed, with the result that the compressor may be damaged. If the boost compressor is damaged, supply of cooling air to the turbine high temperature section may be suspended, and the turbine high temperature section cooling flow path may be closed due to intrusion of foreign substances. This may cause damages.

Furthermore, deposition of mist on the equipment forming the cooling air system may cause rust inside the equipment. Such rust will turn into dust generated newly in the cooling air system, and will become a new factor to block the cooling air flow path. For these reasons, if such an event occurs to the cooling air system, cooling air cannot be maintained clean even if the equipment constituting the cooling air system is provided with a high-performance filter capable of separating fine dust is provided. Such a cooling air system is not suitable for cooling the high temperature section of the turbine.

The object of the present invention is to avoid occurrence of mist in the cooling air system of the gas turbine.

A gas turbine according to the present invention comprising a compressor for compressing air, a combustor for mixing air compressed by the compressor with fuel and burning them, and a turbine to be driven by combustion gas burned by the combustor is characterized by further comprising;

- a cooling air system for supplying part of air compressed by said compressor to the high temperature section of the turbine;
- a heater exchanger for exchanging heat of part of air compressed by the compressor, this exchanger installed on the cooling air system; and
- a system for adjusting air temperature on the downstream side of the heater exchanger in conformity to the operation time of the turbine.

DETAILED DESCRIPTION OF THE INVENTION

First Embodiment

Figure 1:
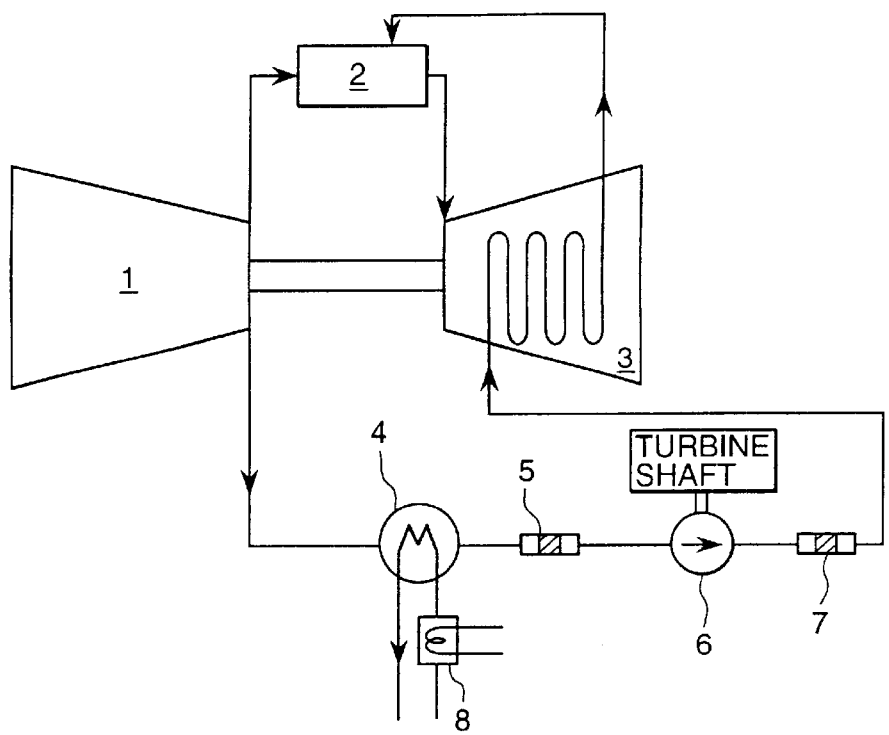
FIG. 1 is a view representing the high-temperature section cooling system of a gas turbine as a first embodiment of the present invention.

The present invention will be described in details with reference to FIG. 1:

FIG. 1 is a drawing representing the configuration of a gas turbine comprising a turbine high temperature section cooling system.

As shown in the drawing, this gas turbine is equipped with a compressor 1 for compressing air, a combustor 2 for mixing air compressed by the compressor 1 with fuel and burning them, and a turbine 3 to be driven by combustion gas burned by the combustor 2. It is also provided with a cooling air system for supplying part of air compressed by the compressor 1 to the high temperature section of the turbine 3.

According to the present embodiment, the cooling air system comprises a heater exchanger 4 for exchanging heat of the air sent from compressor 1, a filter 5 as dust removing means for removing dust from, the air the heat of which is exchanged, a boost compressor 6 for compressing air cleaned by filter 5, and a filter 7 as dust removing means for removing dust from air compressed by boost compressor 6.

In the air cooling system, the side of compressor 1 will be called upstream side, and the side of turbine high temperature section will be called downstream side hereafter.

Compressed air branched off at the outlet of compressor 1 has its heat exchanged by the heat exchanger 4. Here heat is exchanged so that air temperature at the outlet of the boost compressor 6 on the downstream side reaches an appropriate level for cooling the high temperature section of the turbine. Air of about 500 degrees Celsius, for example, is cooled down to about 100 degrees Celsius by this heater exchanger 4. In other words, it is cooled down to the appropriate air temperature, with consideration given to rise of air temperature in the boost compressor 6.

Cooling air is led from the heat exchanger 4 to the filter 5. This filter removes such foreign substances as mist and dust from air.

Then the pressure of cooling air increase by boost compressor 6. Namely, the boost compressor 6 can boost the pressure to the optimum level as fuel mist air and as turbine high temperature section cooling air. In this case, air temperature rises from about 100 degrees Celsius to about 240 degrees Celsius, for, example.

In the present embodiment, a filter 7 or strainer is installed on the downstream side of the boost compressor 6 as well. Air is purified with consideration given to cooling air supplied to the high temperature section of the turbine 3 and fuel oil spray air supplied to the combustor 2.

The cooling air of about 240 degrees Celsius purified in the aforementioned manner is fed to the high temperature section of the turbine to cool the high temperature section of the turbine, where it is heated to a temperature of about 500 degrees Celsius and is supplied to the combustor 2.

In the turbine startup period when the turbine is started by the attached starter, ignited and increased in speed, the temperature of air discharged from the compressor 1 does not increase as compared to the temperature of air sucked in the compressor 1. This air temperature is lower than that of air discharged from compressor 1 at the rated load. Accordingly, air temperature at the heater exchanger outlet is also reduced due to low air temperature at the inlet of the heater exchanger 4.

In such a turbine startup period, mist may occur in cooling air downstream from the heater exchanger 4. If mist occurs in cooling air, dust in cooling air may deposit on the wall surface of the cooling air flow path formed on the high temperature section of the turbine. Then many fine dust particles contained in cooling air may be combined to form a big lump of dust. If this occurs, a complicated and elaborately formed cooling flow path formed on the turbine high temperature section may be locked. Blocking of the cooling air flow path may cause insufficient cooling due to insufficiency of cooling air supplied to the high temperature section of the turbine, with the result that the high temperature section of the turbine may be damaged. Further, the auxiliary machines constituting the cooling air system may be damaged. Especially the boost compressor 6 constituting the system is a rotary body driven at a high speed. So if mist in air with high-speed air flow is supplied to the boost compressor, it will collide with the impeller at a high speed. This may damage the boost compressor 6.

If the boost compressor 6 is damaged, only insufficient amount of cooling air will be sent to the high temperature section of the turbine, and this may damage the turbine high temperature section. Furthermore, the damaged boost compressor 6 causes foreign substances to be mixed into cooling air, with the result that the flow path for cooling the high temperature section of the turbine may be blocked. What is more, the turbine itself may be damaged directly by the foreign substance mixed into cooling air resulting from the damaged boost compressor 6.

Further, deposition of mist on the equipment forming the cooling air system may cause rust inside the equipment. Such rust will turn into dust generated newly in the cooling air system, and will become a new factor to block the cooling air flow path for cooling the high temperature section of the turbine.

If the aforementioned event occurs to the cooling air system, cooling air cannot be maintained clean, even if the equipment constituting the cooling air system is provided with a high-performance filter capable of separating fine dust is provided. Suck an air cooling system is not suitable for cooling the high temperature section of the turbine.

Figure 9:
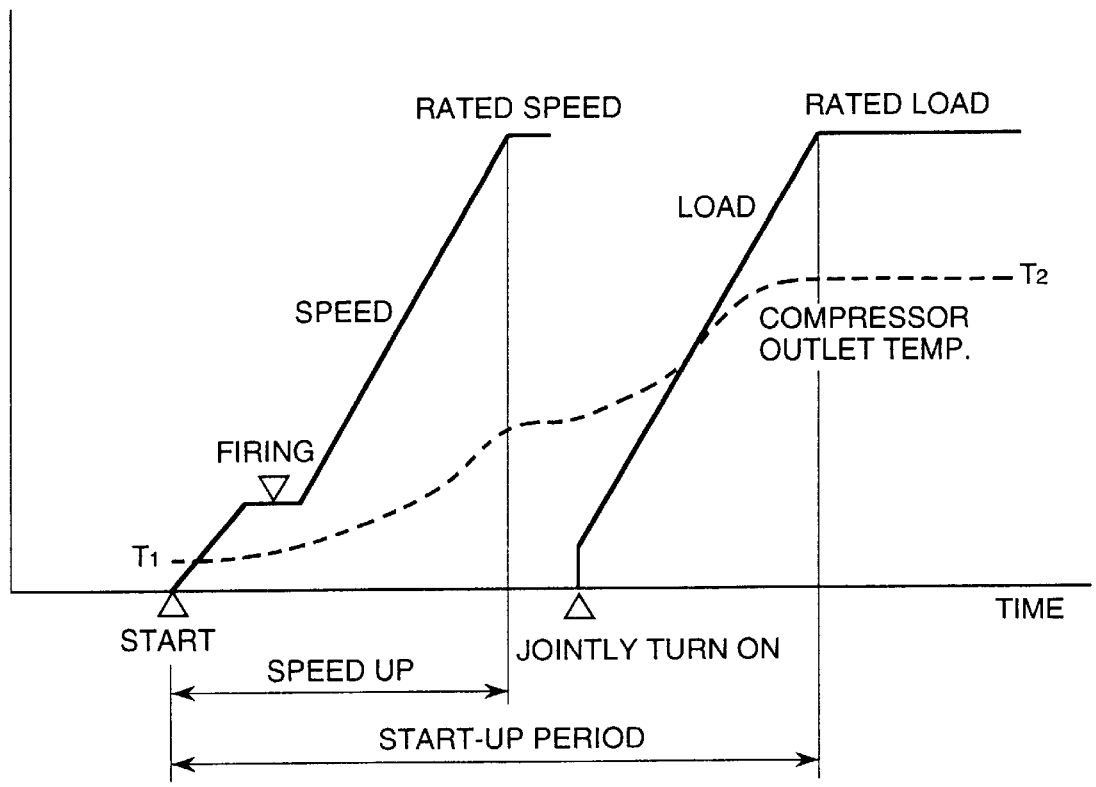
FIG. 9 is a view of the operation status at gas turbine startup as an embodiment of the present invention.

Here there are different turbine operation periods. FIG. 9 shows the changes in drive speed and load with the passage of time.

The rated drive speed is reached after start of the turbine and increase of speed. Firing occurs during the period of speed increase. Then the load is gradually increased from the time of parallel-in operation to reach the rated load. Compressed air temperature from the compressor 1 changes under various conditions. It rises from T1 to T2, for example, as shown in FIG. 9. In the present embodiment, the startup period is defined as the period from the start of the turbine to the arrival of the rated load. It is preferred to adjust the air temperature in order to avoid occurrence of mist at a desired time during this startup period.

To ensure that the cooling air temperature will not be reduced excessively, a system is provided to adjust the air temperature downstream from the heater exchanger 4 in conformity to the turbine operation period.

For example, means for heating the coolant used in the indirect type heater exchanger 4 is provided as a system for adjusting air temperature downstream from the heater exchanger 4. Coolant used in the indirect type heater exchanger 4 is heated by the heater 8, and temperature is adjusted to the appropriate cooling air temperature, whereby preventing mist from occurring due to excessive reduction of the temperature of air at the outlet of the heater exchanger 4. The temperature of the coolant supplied to the heater exchanger 4 is controlled by the temperature of air close to the outlet of the heater exchanger 4 or on the downstream side, whereby appropriate cooling air temperature can be obtained. It is also possible to get appropriate cooling air temperature using the temperature of air discharged from the compressor 1.

However, if the turbine is started and ignition is made to increase the speed by the starter attached to the turbine, the temperature of air at the outlet (downstream side) of the compressor 1 will rise sufficiently. Even without heating coolant supplied to the heater exchanger 4 for exchanging heat of cooling air branched off from the compressor 1 to cool the high temperature section of the turbine, air at the outlet of the heater exchanger 4 can be adjusted to the appropriate temperature as cooling air without mist occurring therein. Accordingly, by monitoring the temperature of air downstream from the heater exchanger 4 evaluation is made to see if the coolant supplied to the heater exchanger 4 must be heated or not, and adjustment can be made to reach the appropriate cooling air temperature. Alternatively, the temperature of air downstream from the compressor 1 is monitored and evaluation is made in the same manner to see if coolant must be heated or not. In this way, coolant temperature can be managed only at the appropriate time. For example, it is preferred to monitor the temperature measuring instrument for measuring the temperature of air of the cooling air system.

If temperature of air at the outlet of the compressor 1 rises subsequent to firing of turbine or increase of speed, occurrence of mist in cooling air can be reduced by overcooling of the heater exchanger 4. Accordingly, after rise of the temperature of air at the outlet of the compressor 1, coolant is supplied to the heater exchanger 4 without being heated, and the turbine is operated.

As described above, the present embodiment reduces the amount of mist occurring to the cooling air system.

A remarkable effect in reducing mist generation can be expected when a closed type coolant air system is used. Namely, in the closed type coolant air system where cooling air for cooling the high temperature section of the turbine is extracted and air after cooling is collected and supplied to the compressor 1 outlet or the combustor chamber, pressures at the cooling air extraction position and collection position are on the same level; therefore, air extracted from the turbine compressor 1 outlet must be increased by the boost compressor the amount equivalent to the pressure loss in the cooling air flow path, pipe and attached equipment on the high temperature section of the turbine. Air the pressure of which is increased by the boost compressor has its temperature increased at the same time.

Further, when consideration is given to the heat resistance of turbine parts constituting the collection path, especially the rotor parts, collected air temperature is preferred to be on the same level as that of the air at the outlet of the turbine compressor. To adjust the cooling air extraction temperature and collected air temperature to the same level, cooling air extracted from the turbine compressor 1 outlet must be cooled by the heater exchanger when consideration is given to possible rise of cooling air temperature resulting from cooling the high temperature section of the turbine. As described above, in the closed air cooling system, the cooling capacity of the heater exchanger is determined to ensure that air can be cooled to an appropriate temperature without any problem even during the operation at the rated load, with consideration given to both rise of temperature by the boost compressor and rise of temperature resulting from cooling of the high temperature section of the turbine. Accordingly, a greater amount of heat can be exchanged in this system than in the heater exchanger used in the conventional cooling method wherein air after cooling is directly discharged into the main stream gas. When the turbine is started, temperature of air at the outlet of the turbine compressor 1 is lower than during operation at the rated load. The amount of heat exchanged by the heater exchanger used in the closed air cooling system is larger than the heater exchanger used in the prior art cooling method, as described above. Cooling air temperature is unnecessarily lowered at the heater exchanger outlet. This will become a new factor for causing mist in air. Further, in the closed air cooling gas turbine, reduction of temperature of the main stream air resulting from discharge of cooling air is held down, and emission gas temperature of the gas turbine tends to become high. So in order to improve the efficiency of the gas turbine as a single body and heat resistance of the emission gas duct, it is preferred to increase the specific pressure of the gas turbine and to keep emission gas temperature on the same level as that of the prior art gas turbine. Raising the specific pressure of the gas turbine also increases the pressure of cooling air, and the partial pressure of the steam contained in cooling air is also increased. In this sense, this will promote generation of mist. Thus, a remarkable effect in reducing the generation of mist can be expected when the present invention is applied to such a closed type system.

Since the temperature of coolant used in the indirect type heater exchanger 4 is adjusted, the cooling system is indirectly controlled without direct control, and this provides a higher reliability of the cooling air system. Namely, even if coolant temperature adjusting mechanism for this heater exchanger 4 is damaged, the cooling air system itself is not seriously affected.

Second Embodiment

Figure 2:
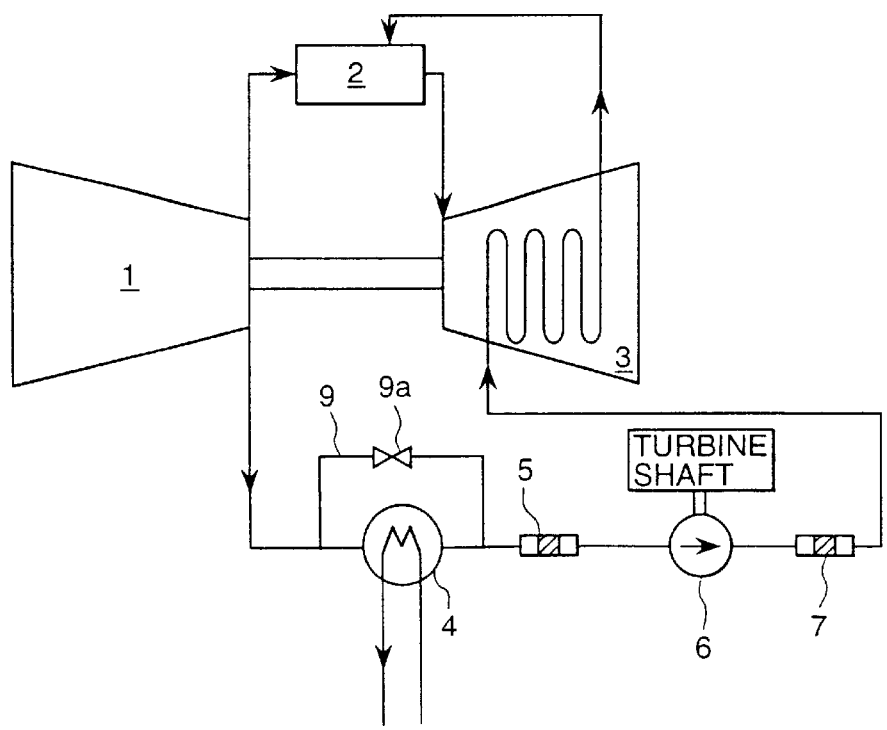
FIG. 2 is a view representing the high-temperature section cooling system of a gas turbine as another embodiment of the present invention.

With reference to FIG. 2, the following describes an example of placing the system 9 for bypassing the heater exchanger 4. When the bypass system 9 is used, temperature of cooling air supplied to the high temperature section of the turbine is adjusted by mixing between high-temperature cooling air and low-temperature cooling air at the heater exchanger outlet without using heater exchanger 4. This prevents cooling air temperature at the outlet of the heat exchanger from lowering when the turbine is started.

The temperature of air at the outlet of the heater exchanger 4 is to an appropriate cooling air temperature by adjusting the flow rate of high-temperature air passing through the bypass system 9 by controlling the opening angle of a valve 9a installed in the bypass system.

If the temperature of air at the compressor 1 outlet is raised, cooling air temperature can be adjusted to an appropriate level without using the bypass system 9, by controlling the flow rate of the coolant fed to the heater exchanger 4, even when all the cooling air is fed to the heater exchanger 4. Accordingly, the valve 9a of the bypass system is totally closed.

The present embodiment reduces generation of mist in the turbine startup period.

Since a bypass system structure is adopted, a simple configuration can be used, and temperature control range can be extended.

Third Embodiment

Figure 3:
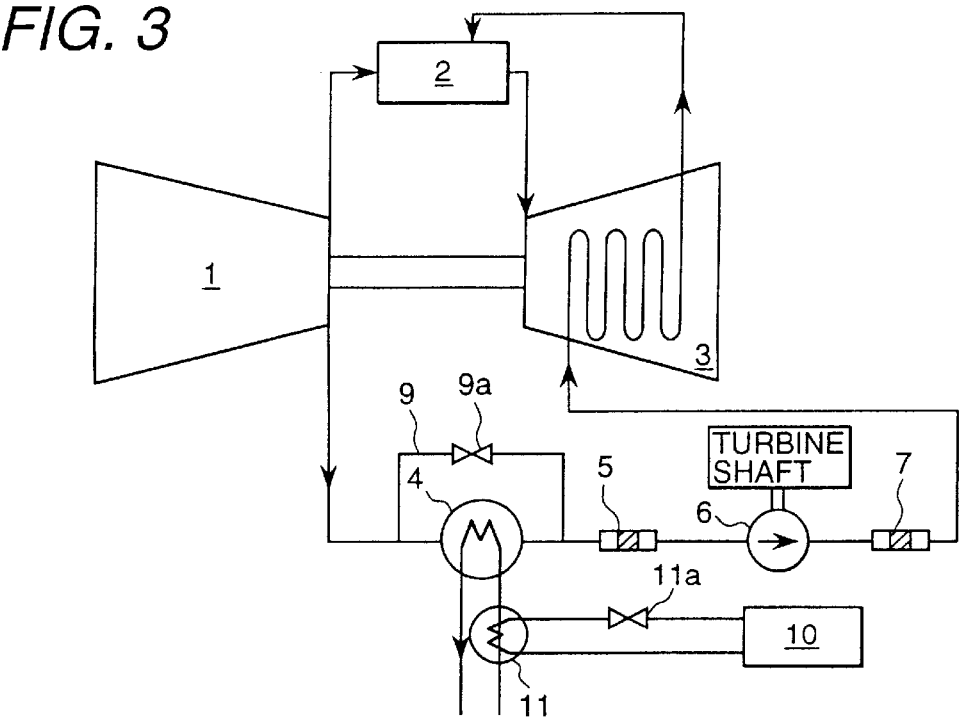
FIG. 3 is a view representing the high-temperature section cooling system of a gas turbine as still another embodiment of the present invention.

In a third embodiment, an auxiliary boiler 10 is installed to heat coolant supplied to the heater exchanger 4 when the turbine is started, as shown in FIG. 3. At the time of startup, coolant is heated when steam from the auxiliary boiler 10 is fed to the heater exchanger 11 installed on the coolant system. More appropriate temperature management can be ensured by controlling the coolant temperature using the temperature of air discharged from the compressor. To adjust this coolant temperature, the flow rate of steam from the auxiliary boiler is adjusted by the valve 11a.

This avoids excessive reduction of the temperature of cooling air supplied to the high temperature section of the turbine when the turbine is started.

If the air temperature at the compressor 1 outlet is raised after turbine startup and firing, heating of coolant becomes unnecessary. So the auxiliary boiler 10 is stopped and coolant is directly fed to the heater exchanger 4. Cooling air temperature is adjusted by controlling the flow rate of coolant fed to the heater exchanger 4.

Fourth Embodiment

Figure 4:
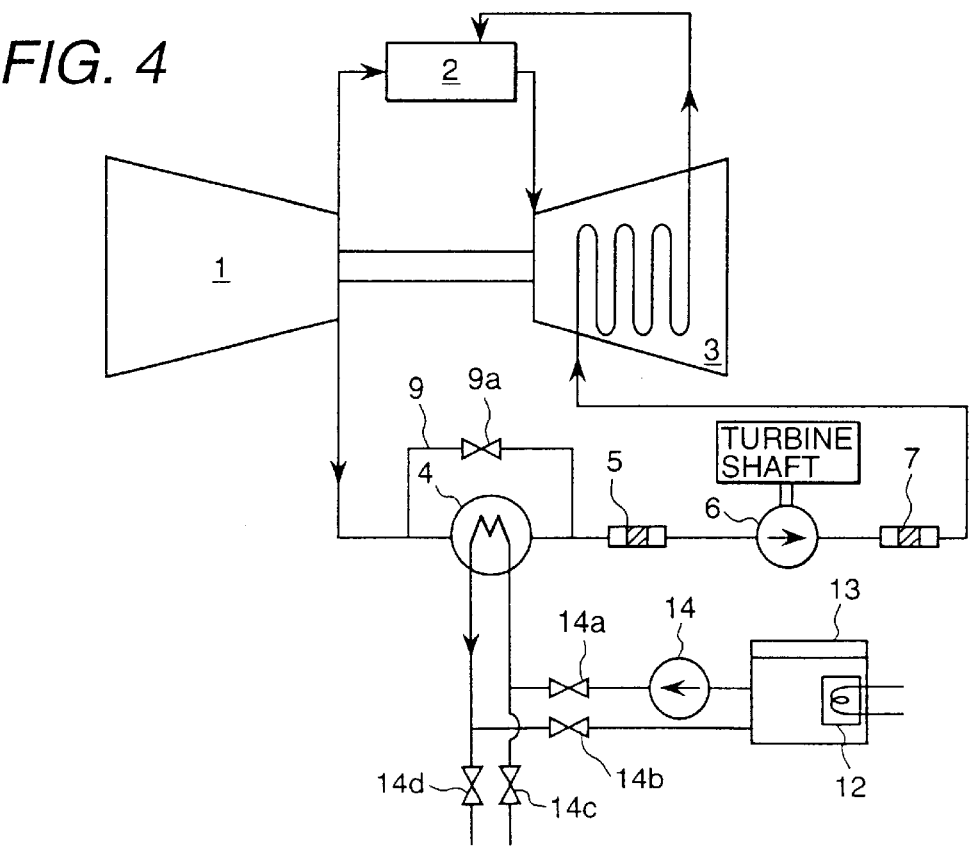
FIG. 4 is a view representing the high-temperature section cooling system of a gas turbine as a further embodiment of the present invention.

In a fourth embodiment, a heater 12 is installed to heat coolant fed to the heater exchanger when the turbine is started, as shown in FIG. 4.

The coolant system is provided with a water storage tank 13 which is used only when the temperature of air discharged from the compressor is low. A heater is installed on the water storage tank 13 to raise the coolant temperature. Coolant of the water storage tank 13 is fed by a feed water pump 14 to the heater exchanger 4 for cooling the cooling air from the compressor 1. Coolant temperature can be kept at an appropriate value by control of the temperature of air discharged from the compressor.

This prevents cooling air temperature from becoming excessively low when the turbine is started.

After turbine startup and firing, heating by the heater 12 installed on the coolant system is suspended and valves 14a and 14b are fully closed. Valves 14c and 14d are fully opened to supply coolant directly to the heater exchanger 4, wherein these valves 14c and 14d are connected to the feed water and drainage system from the coolant system which is shared by other equipment using coolant installed on the turbine equipment.

Fifth Embodiment

Figure 5:
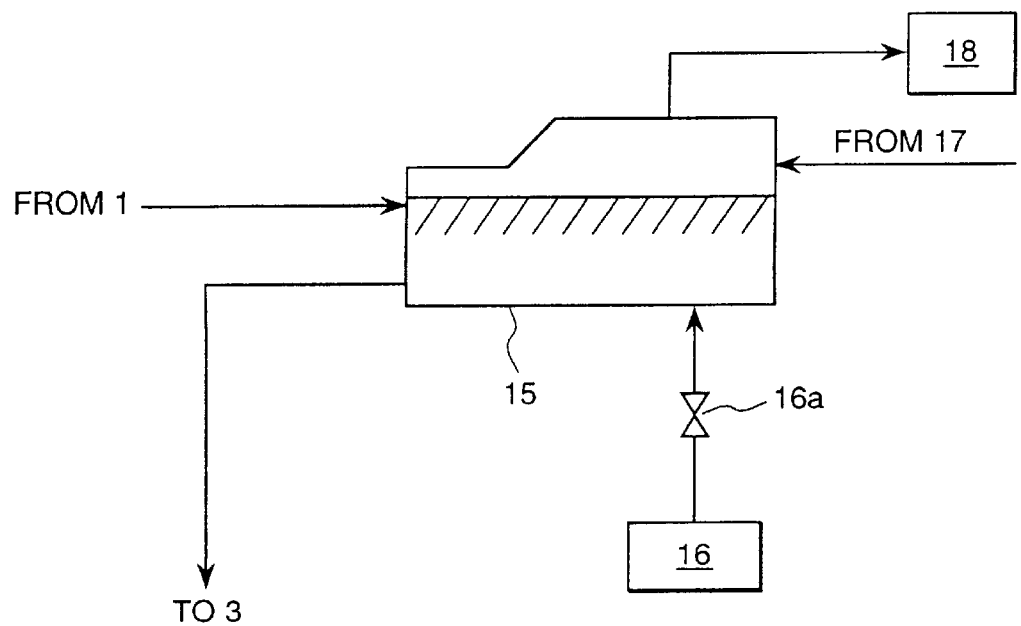
FIG. 5 is a view representing the high-temperature section cooling system of a gas turbine as a still further embodiment of the present invention.

In the fifth embodiment, an evaporator 15 is used for cooling the air discharged from the compressor, as shown in FIG. 5. An auxiliary boiler 16 used only when the turbine is started in this case.

This allows steam from the auxiliary boiler 16 to be fed inside the evaporator 15 when the turbine is started, whereby coolant temperature inside the evaporator is raised.

Water coming the feed water system 17 is turned into steam when heat of cooling air is exchanged by the evaporator 15, and is fed to the steam turbine and other equipment 18. This allows heat to collected, and plant efficiency is improved.

Coolant temperature inside the evaporator is adjusted by controlling the flow rate of the steam coming from the auxiliary boiler 16 through the valve 16a. Coolant temperature can be kept at an appropriate value by control of the temperature of air discharged from the compressor. If temperature of air at the outlet of the compressor 1 is raised after turbine startup and firing, feed of steam from the auxiliary boiler 16 is stopped and heating of coolant inside the evaporator is suspended. Air at the outlet of the evaporator 15 is used as cooling air for turbine high temperature section.

If the temperature of air at the outlet of the compressor 1 is raised, temperature of air at the outlet of the evaporator 15 is adjusted by controlling coolant level in the evaporator.

This avoids excessive reduction of the temperature of cooling air at the outlet of the evaporator.

Sixth Embodiment

Figure 6:
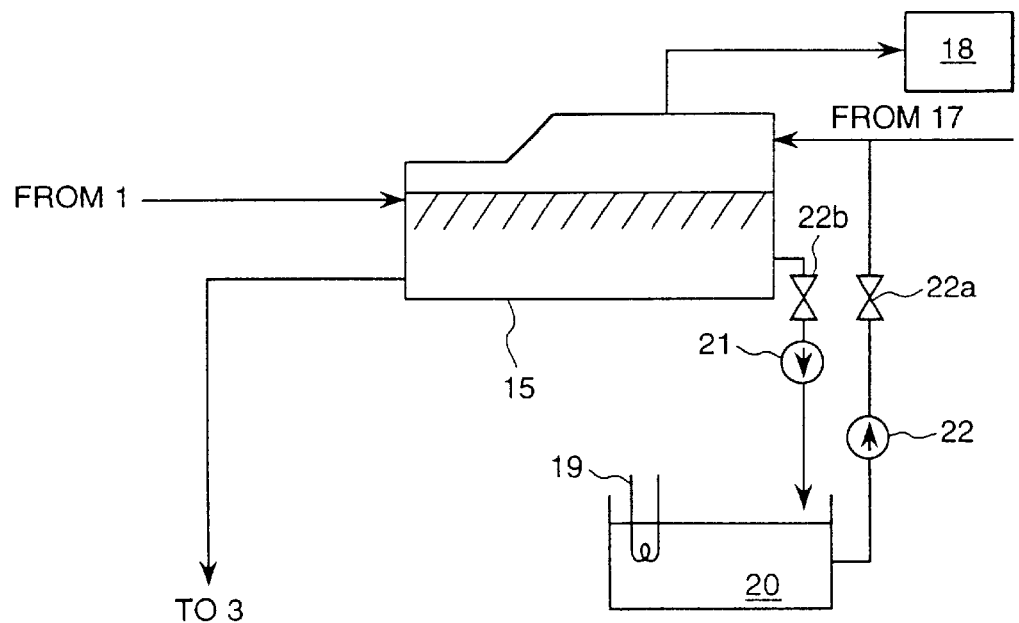
FIG. 6 is a view representing the high-temperature section cooling system of a gas turbine as a still further embodiment of the present invention.

In a sixth embodiment, a heater 19 is installed to raise the temperature of coolant in the evaporator 15 when the turbine is started, as shown in FIG. 6. A water storage tank 20 for heating by a heater 19 and pumps 21 and 22 for circulating coolant are installed. Coolant temperature can be kept at an appropriate level by adjusting the flow rate of coolant circulating in the water storage tank and by controlling the temperature of air discharged from the compressor.

This avoids excessive reduction of temperature of cooling air at the outlet of the evaporator 15.

If temperature of air at the outlet of the compressor 1 is raised after turbine startup and firing, heating by the heater 19 installed on the coolant system is suspended and circulation to the water storage tank is stopped. Circulating pumps 21 and 22 are stopped and valves 22a and 22b fully closed. Coolant is fed to the heater exchanger 4 directly from the coolant feed system 17.

If temperature of air at the outlet of the compressor 1 is raised, temperature of air at the outlet of the evaporator 15 is adjusted by controlling the coolant level in the evaporator.

Seventh Embodiment

Figure 7:
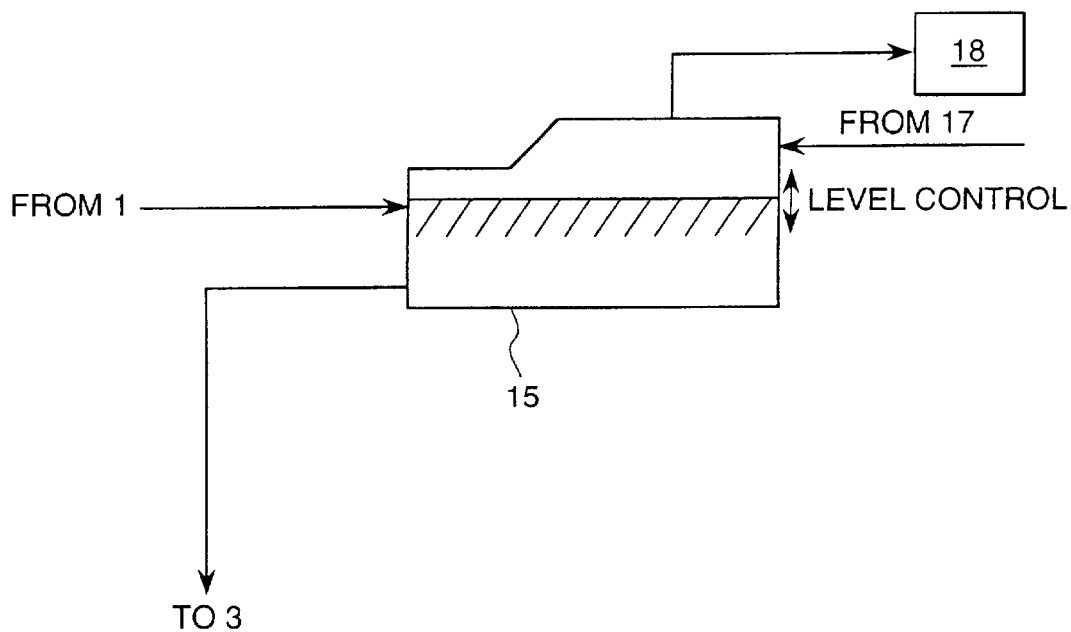
FIG. 7 is a view representing the high-temperature section cooling system of a gas turbine as a still further embodiment of the present invention.

In a seventh embodiment, as shown in FIG. 7, the feed rate of the coolant in the evaporator 15 is changed when the turbine is started and coolant level is lowered to the level above the minimum amount of coolant permissible to the evaporator. This avoids excessive reduction of temperature of cooling air at the outlet of the evaporator 15.

After turbine startup, coolant level in the evaporator 15 is increased in conformity to the rise of temperature of air at the outlet of the compressor 1, thereby controlling air temperature. This avoids excessive decrease of temperature of air at the outlet of the evaporator at startup. At the same time, without depending on the operation status, air temperature can be kept at an appropriate level by adjusting the water level through monitoring of the temperature of air at the outlet of the compressor, temperature of air at the outlet of the heater exchanger or temperature of air at the outlet of the booster.

Eighth Embodiment

Figure 8:
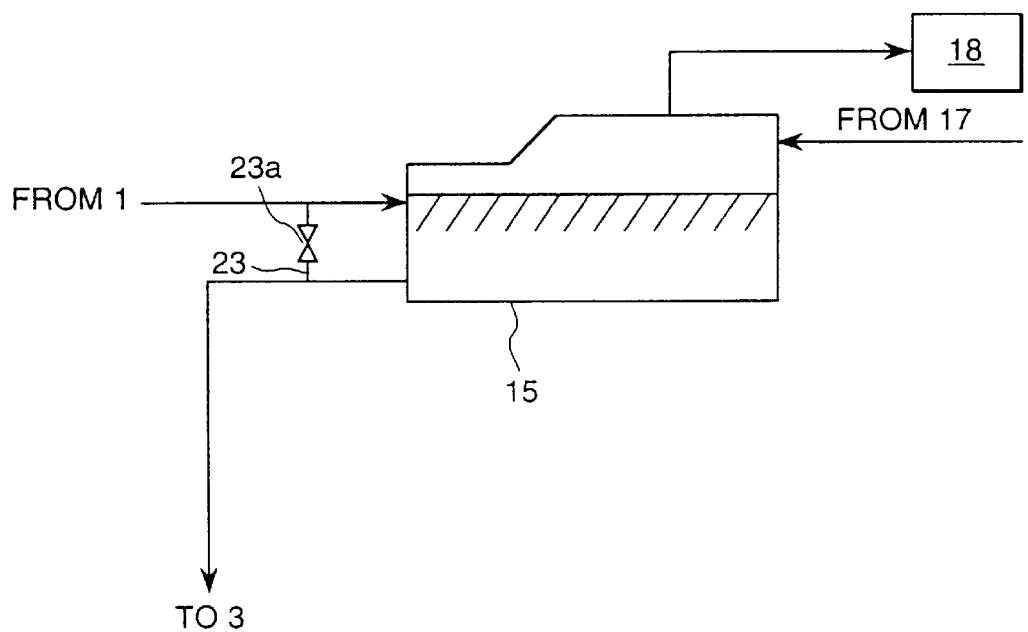
FIG. 8 is a view representing the high-temperature section cooling system of a gas turbine as a still further embodiment of the present invention.

In an eighth embodiment, a system 23 for bypassing the evaporator 15 at turbine startup is installed, as shown in FIG. 8. The temperature of air supplied to the high temperature section of the turbine is adjusted by mixing between high-temperature cooling air and low-temperature cooling air at the evaporator outlet using the bypass system 23 without an evaporator.

The above configuration avoids excessive reduction of cooling air temperature at turbine startup.

If the temperature of air at the outlet of the compressor is raised after turbine startup and firing, the valve 23a installed on the bypass system 23 is fully closed to allow all the cooling air to be fed to the evaporator without using bypass system.

As described above, generation of mist in cooling air is prevented by avoiding excessive reduction of cooling air temperature at turbine startup. Reduction of mist generation prevents dust from depositing to the cooling air flow path, and prevents the cooling air flow path from being blocked. At the same time, damage of the auxiliary equipment installed on the system can also be avoided.

The present invention has the effect of reducing mist generation in the cooling air system of a gas turbine at the time of startup.

What is claimed is:

1. A gas turbine comprising a compressor for compressing air, a combustor for mixing air compressed by said compressor with fuel and burning them, and a turbine to be driven by combustion gas burned by said combustor;

said gas turbine further comprising;

a cooling air system for supplying part of air compressed by said compressor to the high temperature section of said turbine;

a heater exchanger for exchanging heat of part of air compressed by said compressor, said exchanger installed on said cooling air system; and a system for adjusting air temperature on the downstream side of said heater exchanger in conformity to the operation time of said turbine.

2. A gas turbine comprising a compressor for compressing air, a combustor for mixing air compressed by said compressor with fuel and burning them, and a turbine to be driven by combustion gas burned by said combustor;

said gas turbine further comprising;

a cooling air system for supplying part of air compressed by said compressor to the high temperature section of said turbine;

a heater exchanger for exchanging heat of part of air compressed by said compressor, wherein said exchanger installed on said cooling air system is an indirect heater exchanger equipped with a coolant feed unit for feeding coolant; and coolant temperature adjusting means for adjusting the temperature of said coolant of said heater exchanger.

3. A gas turbine comprising a compressor for compressing air, a combustor for mixing air compressed by said compressor with fuel and burning them, and a turbine to be driven by combustion gas burned by said combustor;

said gas turbine further comprising;

a cooling air system for supplying part of air compressed by said compressor to the high temperature section of said turbine, and for supplying to the combustor the air having cooled the high temperature section of said turbine, a heater exchanger for exchanging heat of part of air compressed by said compressor and a coolant system boost compressor for compressing air between said heater exchanger and said turbine high temperature section, wherein said heater exchanger and booster compressor are installed on said cooling air system, and a system for adjusting air temperature on the downstream side of said heater exchanger in conformity to the operation time of said turbine.

4. A gas turbine according to claim 1 further characterized by comprising an auxiliary boiler or heater for overheating the coolant of said heater exchanger.

5. A gas turbine according to claim 1 further characterized by comprising;

an auxiliary boiler for overheating the coolant of an evaporator wherein said heat exchanger is used as said evaporator, a heater for overheating the coolant of said evaporator or a controller for controlling the water level for said evaporator.

* * * * *